(No Model.)

S. I. SNYDER.
CHUCK FOR WATCH MAKERS.

No. 250,992. Patented Dec. 13, 1881.

Witnesses:
A. M. Long.
A. M. Tanner.

Inventor,
Samuel I. Snyder
By Paine, Grafton & Ladd,
Attorneys.

UNITED STATES PATENT OFFICE.

SAMUEL I. SNYDER, OF CLEARFIELD, PENNSYLVANIA.

CHUCK FOR WATCH-MAKERS.

SPECIFICATION forming part of Letters Patent No. 250,992, dated December 13, 1881.

Application filed June 27, 1881. (No model.)

*To all whom it may concern:*

Be it known that I, SAMUEL I. SNYDER, a citizen of the United States, residing at Clearfield, in the county of Clearfield and State of Pennsylvania, have invented certain new and useful Improvements in Chucks for Watch-Makers, &c.; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of the present invention is to provide a chuck for watch-makers and jewelers which is adapted to hold watch-wheels and their arbors and watch-bezels and other analogous articles.

To this end the invention consists in adjustable dogs of a peculiar construction, arranged on the front of a face-plate and operated by means of a scroll-plate located at the rear side of said face-plate, as will hereinafter be more fully described, and then set forth in the claim.

Figure 1:
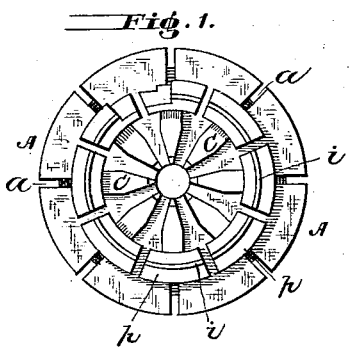
Figure 2:
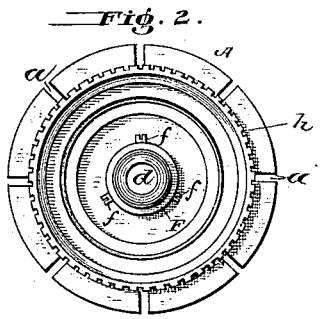
Figure 3:
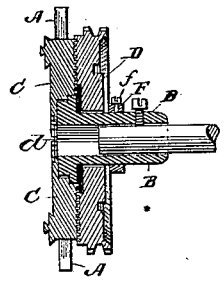
Figure 4:
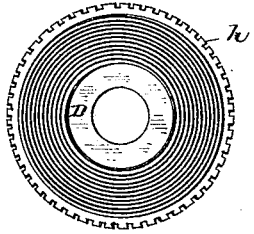
Figure 5:
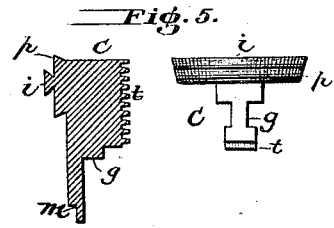
Figure 6:
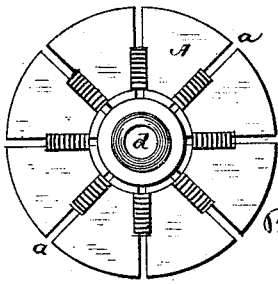

In the drawings, Figure 1 is a face view of a chuck embodying my improvements. Fig. 2 is a rear view of the same. Fig. 3 is a central section, exhibiting more fully the arrangement of the face-plate, adjustable dogs, and scroll-plate. Fig. 4 is a face view of the scroll-plate. Fig. 5 is a detail view of one of the dogs provided with work-retaining jaws at both ends. Fig. 6 is a rear view of the face-plate and dogs.

The face-plate A of the chuck is provided with radial slots $a$, which extend from the periphery thereof to near the center of said plate. This plate is constructed with a rear cylindrical extension, B, which has a socket for the reception of a mandrel of a lathe or other machine. A central opening, $d$, in the face-plate leads into the socket of the cylindrical extension. The dogs or work-holders C are fitted into the slots of the face-plate, and are adjusted radially or caused to travel from the center to the periphery of the plate, or vice versa, by means of a scroll-plate, D, which is fitted on the cylindrical extension B, so as to turn thereon. A collar, F, retained by suitable screws, $f$, bears against the rear face of the scroll-plate, and serves to prevent an endwise movement thereof.

The front face of the scroll-plate is provided with a continuous scroll rib or thread, which meshes into rack-teeth on the various dogs or work-holders for moving the same in and out as the scroll-plate is turned.

Each dog or work-holder C comprises a plate sliding on the front of the face-plate, a neck, $g$, made narrower than said face-plate and moving in the slot in the latter, and a rear face, $t$, having rack-teeth formed thereon, which mesh into the scroll or convolute rib or thread on the scroll-plate D.

The dogs are inserted from the periphery or edge of the face-plate, and are prevented from dropping therefrom by making their rack portions wider than the necks which fit and move in the slots. The outer end of each dog is enlarged by attaching an arc-shaped plate, $p$, thereto, or by making said dog with an end enlargement, which forms an integral part of the same.

Each plate or enlargement $p$ of the dog is provided with a face-rib, $i$, which is undercut or beveled, as is clearly shown in Fig. 5. The inner and outer edges of the plates $p$ are also beveled, so that when the different dogs are in their proper positions unbroken or circular ring-grooves are formed by the beveled ribs and edges of the dogs. These grooves constitute jaws or cleats for holding the inside and outside rims of watch-bezels and other parts of a watch or other analogous objects.

The plates of two adjoining dogs are suitably shaped so as to provide for the reception of the hinge part of the bezel or watch-case. The inner end of each dog is provided with an offset or shoulder, $m$, which collectively form a ring-groove for the reception of larger-sized watch-wheels.

The ends of the dogs serve to hold smaller-sized wheels resting directly upon the face-plate and surrounding the central opening thereof. It will be obvious that said opening serves to receive the arbors of the wheels, which are held by the dogs.

The scroll-plate is constructed with a milled or roughened rim or edge, as is shown at $h$, so as to permit it to be easily grasped for rotating it.

The chuck above described is in many particulars like the one patented by me on the 28th day of June, 1881, No. 243,467. In this patent, however, the scroll-plate is located on the front side of the face-plate, at the center thereof, and for this reason the chuck is incapable of holding watch-wheels and their arbors. By locating the scroll-plate on the rear side of the face-plate and constructing the dogs with inner and outer jaws the chuck shown in the present instance is adapted for holding watch-wheels of all sizes without removing the same from their arbors.

Having thus described my invention, what I claim as new, and desire to secure by Letters Patent, is—

The combination of the independent adjustable dogs C, having outer and inner holding-jaws for watch-bezels and watch-wheels, and constructed with rear rack-faces, $t$, and intermediate necks, $g$, with the slotted face-plate A, having rear central hub, B, and the scroll-plate D, fitted on the latter, as and for the purpose set forth.

In testimony whereof I affix my signature in presence of two witnesses.

SAMUEL I. SNYDER.

Witnesses:
WM. S. TAYLOR,
DANIEL CONNELLY.